United States Patent [19]

Yamamoto et al.

[11] Patent Number: 5,267,089
[45] Date of Patent: Nov. 30, 1993

[54] INCLINATION ADJUSTING DEVICE FOR AN OBJECTIVE LENS FOR AN OPTICAL INFORMATION RECORDING AND REPRODUCTION APPARATUS

[75] Inventors: Yasuhiro Yamamoto, Tenri; Yoshihiro Sekimoto; Tetsuo Ueyama, both of Nara, all of Japan

[73] Assignee: Sharp Kabushiki Kaisha, Osaka, Japan

[21] Appl. No.: 962,905

[22] Filed: Oct. 19, 1992

[30] Foreign Application Priority Data

Oct. 22, 1991 [JP] Japan .................................. 3-274334

[51] Int. Cl.[5] .............................................. G02B 7/02
[52] U.S. Cl. .................................... 359/822; 359/824; 369/44.16
[58] Field of Search ............... 359/822, 813, 814, 811, 359/823, 824, 819, 820, 872, 881; 369/44.15, 44.16

[56] References Cited

U.S. PATENT DOCUMENTS 4,099,852 7/1978 Kobierecki et al. ................ 359/814
4,498,737 2/1985 Doggett .............................. 359/813

FOREIGN PATENT DOCUMENTS

1-282736 11/1989 Japan .
2-294935 12/1990 Japan .

Primary Examiner—Loha Ben
Attorney, Agent, or Firm—Nixon & Vanderhye

[57] ABSTRACT

An inclination adjusting device for an objective lens used for an optical information recording and reproduction apparatus with a reduced number of components for a small size and light weight is provided. An objective lens is held at an end portion of a plate spring. The other end portion of the plate spring is fixed to an adjusting board, which is supported in a manner so that it can tilt against a base on a spherical element as a support. The adjusting board is properly positioned with regard to the base by use of one guide pin. The adjusting board is tilted in the longitudinal direction of the plate spring and in the direction crossing the longitudinal direction by use of a first and second adjusting screws, respectively.

8 Claims, 6 Drawing Sheets

INCLINATION ADJUSTING DEVICE FOR AN OBJECTIVE LENS FOR AN OPTICAL INFORMATION RECORDING AND REPRODUCTION APPARATUS

BACKGROUND OF THE INVENTION

1. Field of the Invention

The present invention relates to an inclination adjusting device for adjusting the inclination of an objective lens or the like, disposed in an optical information recording and reproduction apparatus in which information is optically recorded, reproduced, or deleted by the radiation of light beams to a recording medium.

2. Description of the Prior Art

Figure 9:
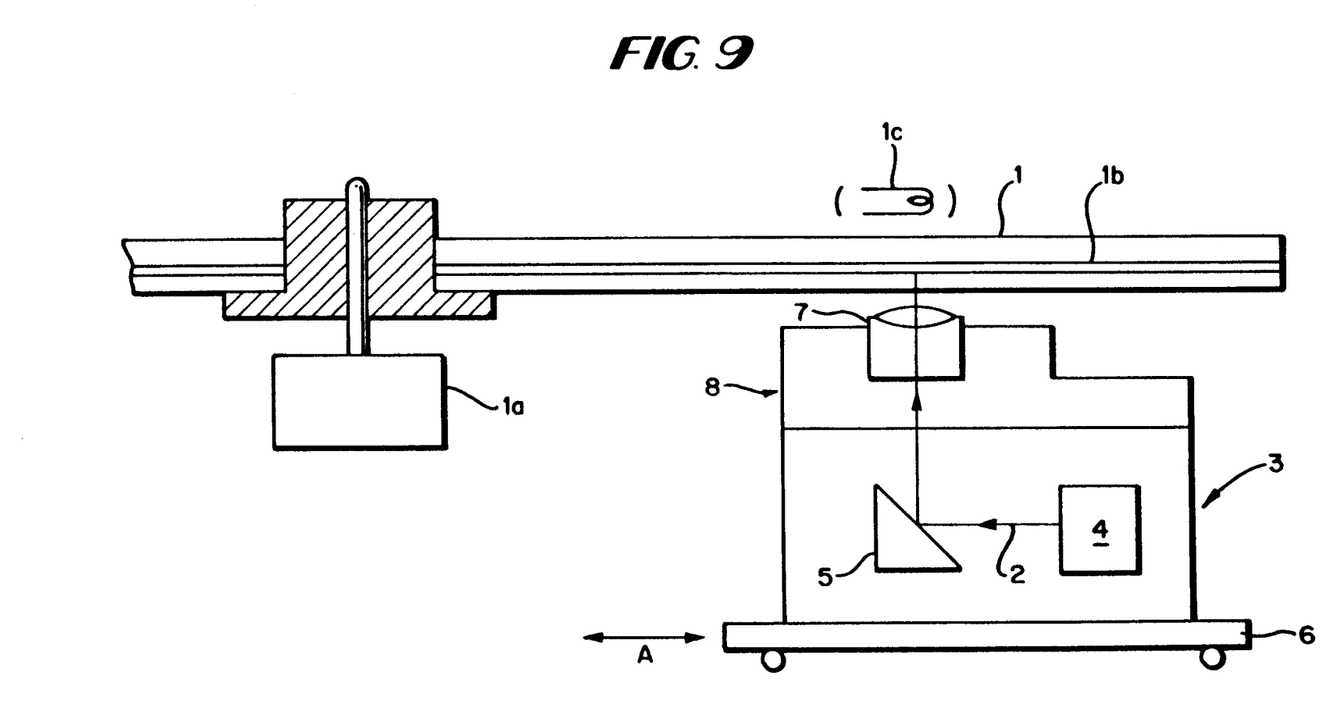
FIG. 9 is a schematic diagram showing an optical pickup for an optical information recording and reproduction device.

FIG. 9 shows an optical pickup used for an optical recording and reproduction apparatus. The optical pickup comprises an optical head 3 which is disposed opposite to an optical disk 1 rotating around a vertical axis with a motor 1a, so as to radiate light beams 2 to a recording medium 1b on the optical disk 1. The optical head 3 includes a laser light source 4 for emitting the light beams 2 in the horizontal direction, a mirror 5 for reflecting the light beams 2 at an angle of 90 degree to direct them to the optical disk 1, and an objective lens 7 for converging the reflected light beams 2 to a spot on the recording medium 1b of the optical disk 1. The optical head 3 also includes a linear motor 6 which allows the optical head 3 to move in the tracking directions shown by a double arrow A. When the optical disk 1 is a magneto-optic disk, a coil 1c for applying a magnetic field to the disk is disposed opposite to the optical head 3 across the disk.

In the pickup having the structure described above, in order to record or reproduce information with high precision, the recording medium 1b of the optical disk 1 must receive the light beams 2 vertically. If the objective lens 7 is disposed with an inclination against the direction of the light beams 2, aberration occurs for the light beams 2 directing from the objective lens 7 to the optical disk 1. As a result, the light beams 2 are not correctly converged onto the right track on the optical disk 1, but adjacent tracks are also irradiated. This causes an Airy ring (second maximum) of the light beams 2 as well as cross talk. To prevent these troubles, the optical pickup is provided with an inclination adjusting device 8 for the objective lens 7 so that the light beams 2 can be focused onto the right track on the optical disk 1.

Figure 10:
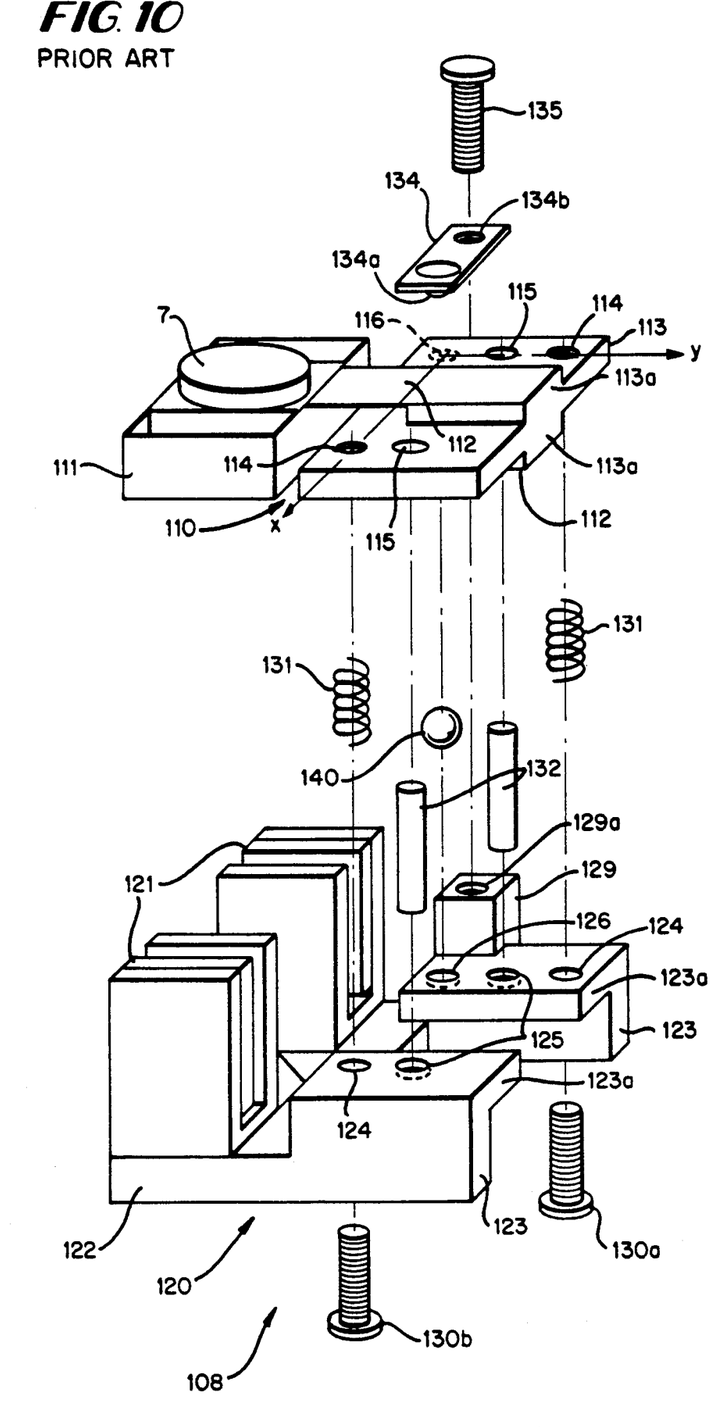
FIG. 10 is an exploded perspective view of a conventional inclination adjusting device for an objective lens for an optical information recording and reproduction apparatus.

As shown in FIG. 10, the inclination adjusting device 108 for the objective lens 7 comprises a base 120 and an adjusting bed 110. The base 120 provides a level for the adjustment of the inclination of an objective lens 7. The adjusting bed 110 holds the objective lens 7 therein, and is supported on the base 120 in a manner that it can tilt against the base 120. The inclination of the objective lens 7 is corrected by adjusting the angle of the inclination of the adjusting bed 110 against the base 120.

The base 120 comprises a pair of support portions 123 appropriately spaced apart from each other on one side and a flat connecting portion 122 on the other side through which the support portions 123 are connected. A pair of magnetic circuits 121 are mounted on the connecting portion 122. The magnetic circuits 121 are appropriately spaced apart from the support portions 123, respectively. The support portions 123 extend upward beyond the height of the connecting portion 122, and the upper portions of the support portions 123 extend horizontally toward each other to form seat portions 123a, respectively. A fixing stand 129 protruding upward is disposed on a portion of one of the seat portions 123a close to the magnetic circuit 121. The fixing stand 129 has a threaded hole 129a in the top surface thereof, into which the bottom portion of a fixing screw 135 described hereafter is screwed.

A cylindrical positioning recess 126 is formed adjacent to the fixing stand 129 on the same seat portion 123a, and receives part of the lower portion of a steel ball 140 as a support. One of through holes 124 is vertically formed through the same seat portion 123a at a position apart from the magnetic circuit 121 with regard to the positioning recess 126, and a first adjusting screw 130a is inserted through the through hole 124 from the bottom thereof. The other through hole 124 is vertically formed through the other seat portion 123a at a position close to the magnetic circuit 121, and a second adjusting screw 130b is inserted through the through hole 124 from the bottom thereof. Pin receiving recesses 125 are formed on the center portions of the seat portions 123a, respectively. The pin receiving recesses 125 receive the lower portions of guide pins 132, supporting the guide pins 132 to stand vertically.

The adjusting bed 110 comprises a flat adjusting board 113 which is supported on the seat portions 123a. Upward and downward protrusions 113a are formed on the center side portion of the adjusting board 113 apart from the magnetic circuits 121 so that they are positioned in the space between the seat portions 123a. End portions of plate springs 112 are attached to the top surface and the bottom surface of the upward and downward protrusions 113a, respectively. The plate springs 112 horizontally extend toward the magnetic circuits 121. A lens holder 111 is attached to the ends, and the objective lens 7 is held in the center portion of the lens holder 111.

Two half portions of the adjusting board 113 separated by the protrusions 113a are put on the seat portions 123a, respectively. A cylindrical recess 116 is formed in the bottom surface of one half portion of the adjusting board 113 so as to correspond to the positioning recess 126 formed in one of the seat portions 123a. The recess 116 receives part of the upper portion of the steel ball 140. The adjusting board 113 is supported in a manner that it can tilt against the seat portions 123a on the steel ball 140.

Threaded through holes 114 are formed through the two half portions of the adjusting board 113 so as to correspond to the through holes 124 formed through the seat portions 123a, respectively. The first and second adjusting screws 130a and 130b which have been inserted through the through holes 124 are screwed through the threaded through holes 114, respectively. The first and second adjusting screws 130a and 130b are positioned on the axis x and the axis y, respectively, on the x-y coordinate with the position of the steel ball 140 as the origin. The first and second adjusting screws 130a and 130b also extend through coil springs 131 which are interposed between the adjusting board 113 and the seat portions 123a, respectively, in their compressed state.

Pin through holes 115 are formed through the two half portions of the adjusting board 113 for allowing the guide pins 132 vertically supported by the pin receiving recesses 125 in the seat portions 123a to extend therethrough, respectively. The adjusting board 113 is set in a proper position with regard to the seat portions 123a of the base 120 by the guide pins 132 which are disposed opposite to each other across the plate springs 112 and movable inside the pin through holes 115.

A pressing plate 134 extends over one half portion of the adjusting board 113 in parallel therewith with one end portion thereof fixed to the top surface of the fixing stand 129. The end portion of the pressing plate 134 has a through hole 134b through which the fixing screw 135 is inserted. The fixing screw 135 is then screwed into the threaded hole 129a of the fixing stand 129. The other end portion of the pressing plate 134 which is free to bend upward and downward, has a hemispherical downward projection 134a formed on the bottom surface thereof. The bottom end of the projection 134a presses a portion on the adjusting board 113 right above the steel ball 140.

The inclination adjusting device for an objective lens having the above-described structure is operated as follows.

The adjusting board 113 is supported tiltably against the seat portions 123a on the steel ball 140 fitted in the positioning recess 126 formed on one of the seat portions 123a. Under the above condition, by turning the first or second adjusting screw 130a or 130b, the adjusting board 113 tilts against the seat portions 123a on the steel ball 140 serving as a support. When the first adjusting screw 130a is turned, an inclination of the adjusting board 113 in the longitudinal direction of the plate springs 112 is adjusted. As a result, the inclination of the objective lens 7 held in the end portion of the plate springs 112 in this direction is also adjusted. When the second adjusting screw 130b is turned, an inclination of the adjusting board 113 in the direction crossing the longitudinal direction of the plate springs 112 is adjusted. As a result, the inclination of the objective lens 7 in this direction is also adjusted. In this way, the inclination of the objective lens 7 against the horizontal level is adjusted, so that the light beams passing through the objective lens 7 are converged onto a spot of the recording medium of the optical disk.

In the above-described device, the pair of guide pins 132 extend through the adjusting board 113, respectively, in a manner that they are slidable inside the through holes. Thus, the adjusting board 113 can tilt smoothly along the guide pins 132. However, the adjusting board 113 and the seat portions 123a must be large enough to accommodate these guide pins. Also, the weight is increased by including two guide pins.

SUMMARY OF THE INVENTION

The inclination adjusting device for an objective lens of this invention comprises: a base providing a level for the adjustment of an inclination; a plate spring holding the objective lens in an end portion thereof; a flat adjusting board supported on the base, the other end portion of the plate spring being fixed to the adjusting board in a manner that the plate spring extends from the adjusting board; a support means for supporting the adjusting board at one of two portions thereof divided along the longitudinal direction of the plate spring in a manner that the adjusting board can tilt against the base in the longitudinal direction of the plate spring and in the direction crossing the longitudinal direction; a pair of adjusting means for moving the adjusting board vertically at certain portions thereof along the longitudinal direction of the plate spring and the direction crossing the longitudinal direction through the support means as a support point; and one guide pin for positioning the adjusting board with regard to the base, the guide pin being supported on the base and extending through the adjusting board.

According to the inclination adjusting device of the present invention, the adjusting board supported tiltably against the base on a support means is allowed to tilt both in the longitudinal direction of the plate spring holding the objective lens and in the direction crossing the longitudinal direction by use of a pair of respective adjusting means. The adjusting board is properly positioned with regard to the base by use of one guide pin supported by the base.

Since the inclination adjusting device of the present invention uses only one guide pin for the positioning of the adjusting board with regard to the base, the device can be small and light-weight. Further, by using a spherical support means, the tilting movement of the adjusting board is smooth. As an alternative, when a support pin having a hemispherical top end is used as a support means disposed in the base, the positioning of the adjusting board with regard to the base can be easily performed. Further, when the hemispherical top end of the support pin and the adjusting board are in point contact, the tilting movement of the adjusting board becomes more smooth. As another alternative, when a support pin having a conical top end is used and the recess in the adjusting board in which the conical top end is fitted is also of a conical shape, the adjusting board can be easily positioned at the support pin. When the support pin is integrally formed with the base, the manufacturing process is simplified and the cost is reduced.

Thus, the invention described herein makes possible the advantage of providing a light-weight, small-size inclination adjusting device for an objective lens with a reduced number of components.

These and other advantages of the present invention will become apparent to those skilled in the art upon reading and understanding the following detailed description with reference to the accompanying figures.

DESCRIPTION OF THE PREFERRED EMBODIMENTS

Figure 1:
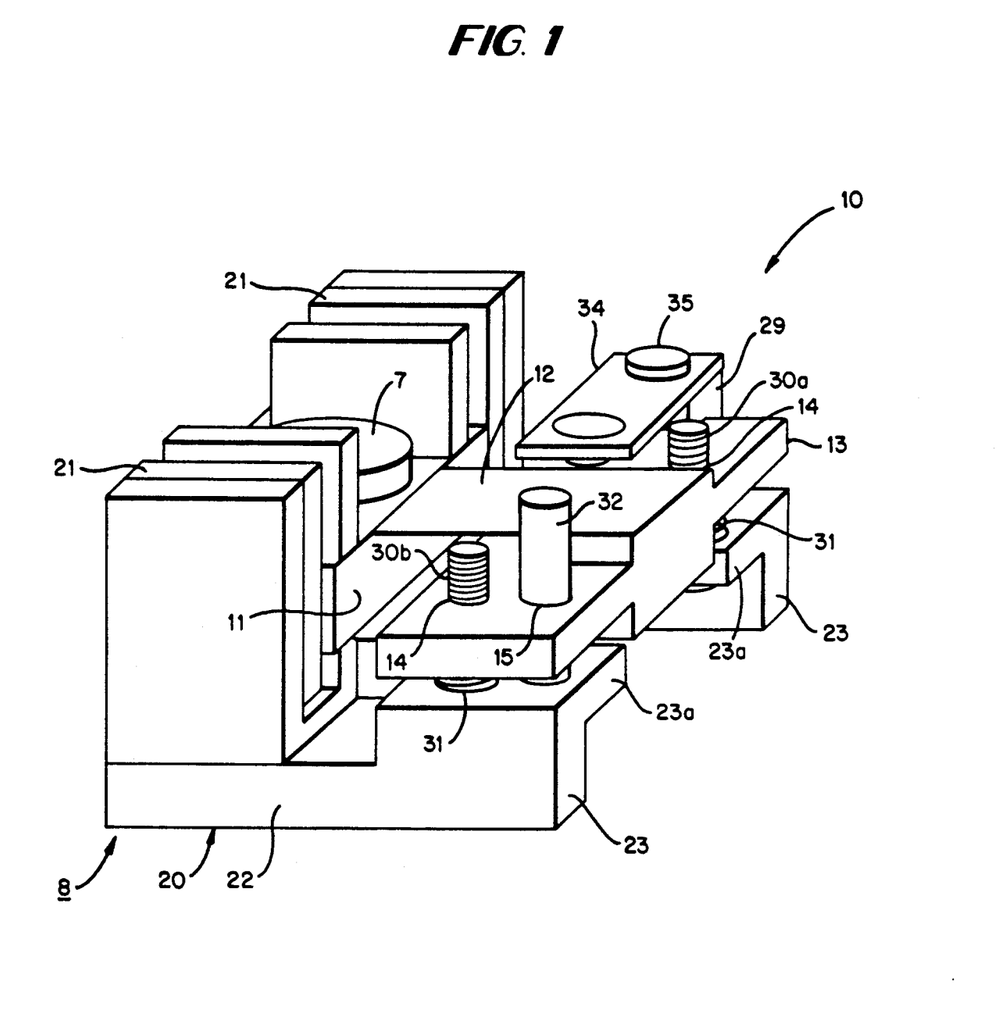
FIG. 1 is a perspective view of an inclination adjusting device for an objective lens used for an optical information recording and reproduction apparatus.
Figure 2:
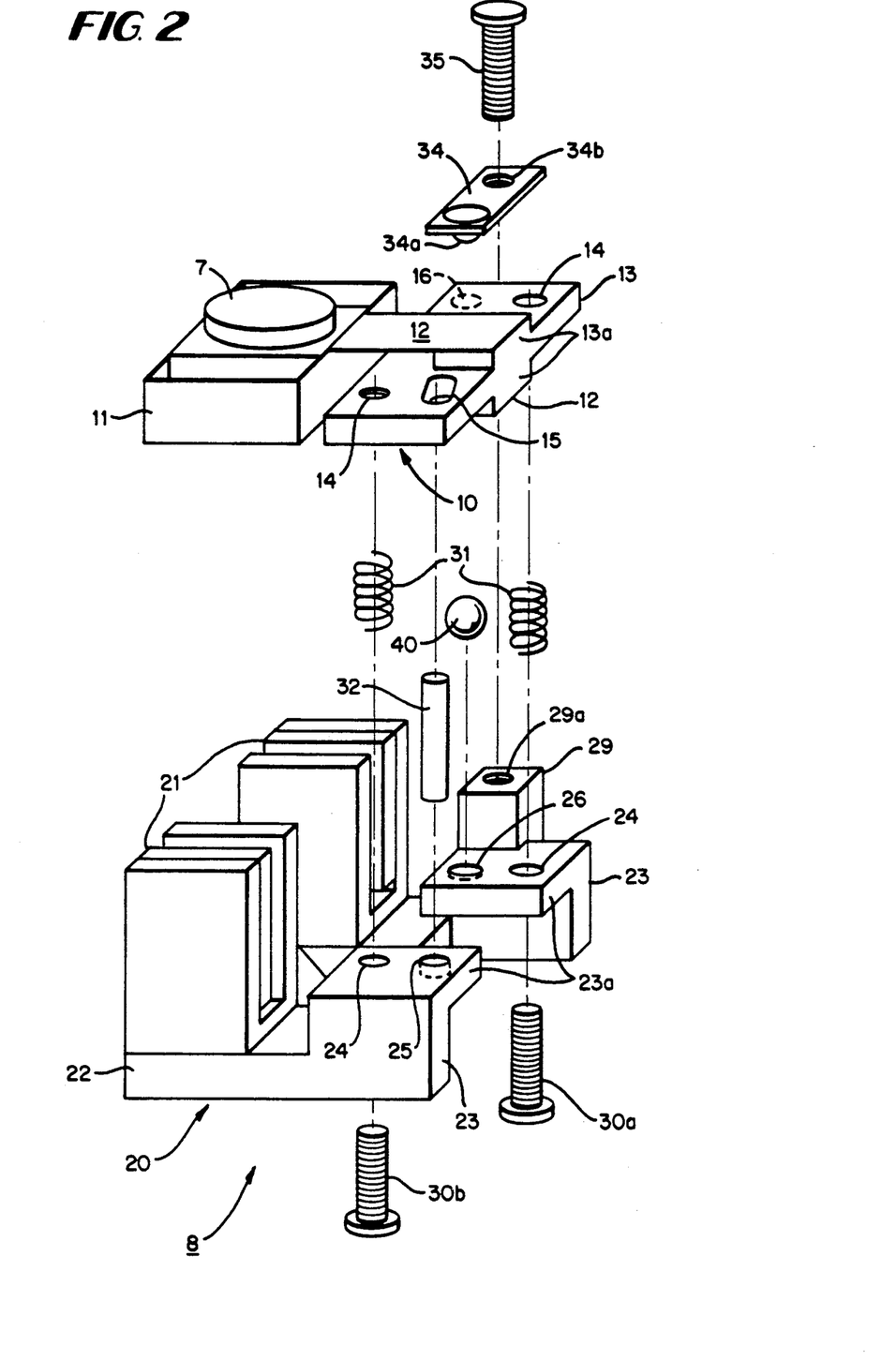
FIG. 2 is an exploded perspective view of the device of FIG. 1.

The present invention will be described by way of example as follows:

As shown in FIGS. 1 and 2, the inclination adjusting device for an objective lens according to the present invention comprises a base 20 and an adjusting bed 10. The base 20 provides a level for the adjustment of the inclination of an objective lens 7. The adjusting bed 10 holds the objective lens 7 therein, and is supported on the base 20 in a manner so that it can tilt against the base 20. The inclination of the objective lens 7 is corrected by adjusting the angle of the inclination of the adjusting bed 10 against the base 20.

The base 20 comprises a pair of support portions 23 formed appropriately spaced apart from each other on one side and a flat connecting portion 22 on the other side through which the support portions 23 are connected. A pair of magnetic circuits 21 are mounted on the connecting portion 22. The magnetic circuits 21 are appropriately spaced apart from the support portions 23, respectively. The support portions 23 extend upward beyond the height of the connecting portion 22, and the upper portions of the support portions 23 extend horizontally toward each other to form seat portions 23a, respectively. A fixing stand 29 protruding upward is disposed on a portion of one of the seat portions 23a close to the magnetic circuit 21. The fixing stand 29 has a threaded hole 29a in the top surface thereof, into which the bottom portion of a fixing screw 35 described hereafter is screwed.

A cylindrical positioning recess 26 is formed adjacent to the fixing stand 29 on the same seat portion 23a, and receives part of the lower portion of a steel ball 40 as a support. One of through holes 24 is vertically formed through the same seat portion 23a at a position apart from the magnetic circuit 21 with regard to the positioning recess 26, and a first adjusting screw 30a is inserted through the through hole 24 from the bottom thereof. The other through hole 24 is vertically formed through the other seat portion 23a at a position close to the magnetic circuit 21, and a second adjusting screw 30b is inserted through the through hole 24 from the bottom thereof. A pin receiving recess 25 is formed on the upper surface of the same seat portion 23a at a position apart from the magnetic circuit 21 with regard to the through hole 24. The pin receiving recess 25 receives the lower portion of a guide pin 32, supporting the guide pin 32 to stand vertically.

The adjusting bed 10 comprises a flat adjusting board 13 which is supported on the seat portions 23a. Upward and downward protrusions 13a are formed on the center side portion of the adjusting board 13 apart from the magnetic circuits 21 so that they are positioned in the space between the seat portions 23a. End portions of plate springs 12 are attached to the top surface and the bottom surface of the upward and downward protrusions 13a, respectively. The plate springs 12 horizontally extend toward the magnetic circuits 21, and a lens holder 11 is attached to the ends of the plate springs 12 so as to be held in parallel with the plate springs 12. The objective lens 7 is held in the center portion of the lens holder 11. In this way, the lens holder 11 is set in the space between the magnetic circuits 21, and thus the objective lens 7 has its position between the magnetic circuits 21.

Figure 3:
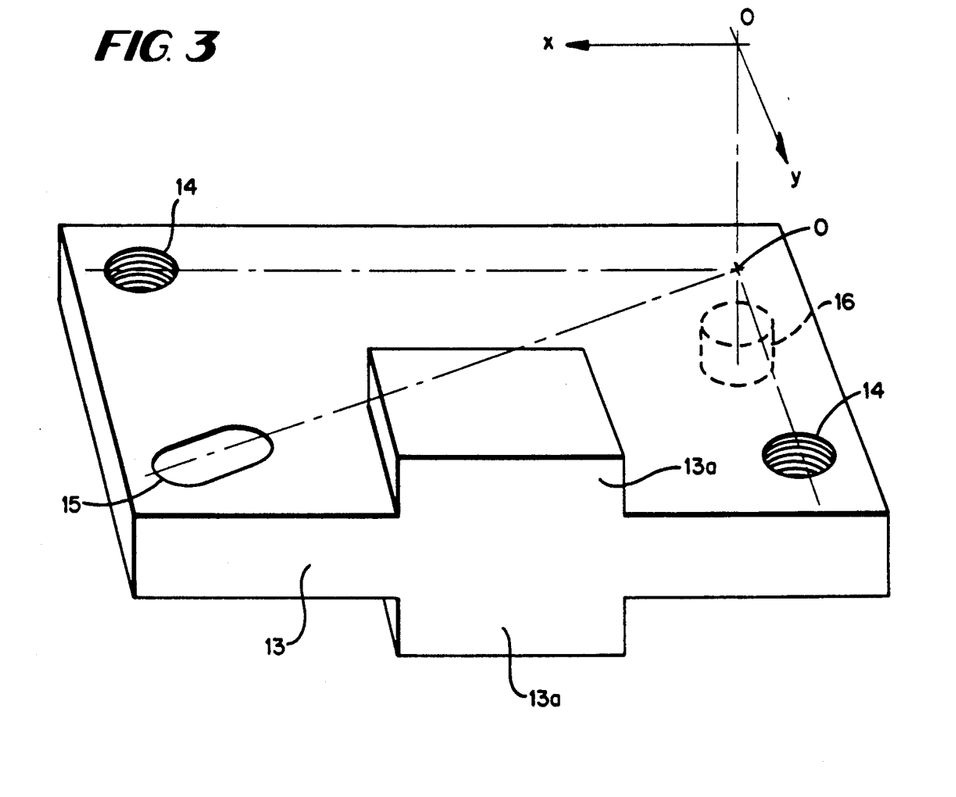
FIG. 3 is a perspective view of an adjusting board used for the device of FIG. 1.

Two half portions of the adjusting board 13 separated by the protrusions 13a are put on the seat portions 23a, respectively. A cylindrical recess 16 is formed in the bottom surface of one half portion of the adjusting board 13 at a position close to the objective lens 7 as shown in FIG. 3, so as to correspond to the positioning recess 26 formed in one of the seat portions 23a. The recess 16 receives part of the upper portion of the steel ball 40 (see FIG. 4). The portions of the recess 16 in contact with the steel ball 40 is slidable on the circumference of the steel ball 40, so that the adjusting board 13 is allowed to tilt against the seat portions 23a on the steel ball 40.

Threaded through holes 14 are vertically formed through the half portions of the adjusting board 13 as shown in FIG. 3, so as to correspond to the through holes 24 formed through the seat portions 23a, respectively. The first and second adjusting screws 30a and 30b which have been inserted through the through holes 24 are screwed through the threaded through holes 14, respectively. The first and second adjusting screws 30a and 30b also extend through coil springs 31 which are interposed between the adjusting plate 13 and the seat portions 23a, respectively, in their compressed state. When the cross point of the axial line of the recess 16 and the upper surface of the adjusting board 13 is the origin O, the longitudinal direction of the plate spring 12 is the axis y, and the direction crossing the axis y is the axis x, the threaded through holes 14 are positioned on the axis y and the axis x, respectively.

A pin through hole 15 is formed through the other half portion of the adjusting board 13 for allowing the guide pin 32 vertically supported by the pin receiving recess 25 in the seat portion 23a to extend therethrough. The pin through hole 15 has a section of an ellipse, and the axial line of the ellipse crosses the axial line of the cylindrical recess 16.

A pressing plate 34 extends over one half portion of the adjusting board 13 in parallel therewith with one end portion thereof fixed to the top surface of the fixing stand 29. The end portion of the pressing plate 34 has a through hole 34b through which the fixing screw 35 is inserted. The fixing screw 35 is then screwed into the threaded hole 29a of the fixing stand 29. The other end portion of the pressing plate 34 which is free to bend upward and downward, has a hemispherical downward projection 34a formed on the bottom surface thereof. The bottom end of the projection 34a presses a portion on the adjusting board 13 right above the steel ball 40, that is, the position of the origin O on the aforementioned x-y coordinate.

The inclination adjusting device for an objective lens having the above-described structure is operated as follows. The guide pin 32 supported on one of the seat portions 23a of the base 20 is inserted through the elliptic pin through hole 15 formed through the adjusting board 13. Then, the adjusting board 13 is set in a proper position where the steel ball 40 is fitted in the positioning recess 26 of the other seat portion 23a is received by the recess 16 of the adjusting board 13. Thus, the adjusting board 13 is supported tiltably against the seat portions 23a on the steel ball 40.

Under the above condition, by turning the first or second adjusting screw 30a or 30b, the adjusting plate 13 tilts against the seat portions 23a on the steel ball 40 serving as a support. When the first adjusting screw 30a is turned, the adjusting board 13 tilts in the longitudinal direction of the plate springs 12, vertically along the axis x on the aforementioned x-y coordinate as shown in FIG. 3, using the steel ball 40 as a support. Thus, the inclination of the adjusting board 13 in the longitudinal direction of the plate springs 12 is adjusted. As a result, the inclination of the objective lens 7 held in the end portion of the plate springs 12 in this direction is also adjusted. On the other hand, when the second adjusting screw 30b is turned, the adjusting board 13 tilts in the direction crossing the longitudinal direction of the plate springs 12, vertically along the axis y on the x-y coordinate, using the steel ball 40 as a support. Thus, the inclination of the adjusting board 13 in the direction crossing the longitudinal direction of the plate springs 12 is adjusted. As a result, the inclination of the objective lens 7 in this direction is also adjusted. In this way, the inclination of the objective lens 7 against the horizontal level is adjusted, so that the light beams passing through the objective lens 7 are converged onto a spot on the recording medium of the optical disk.

The elliptic through hole 15 allows the adjusting board 13 to tilt in either of the above directions smoothly since it is slidable along the guide pin 32.

Figure 4:
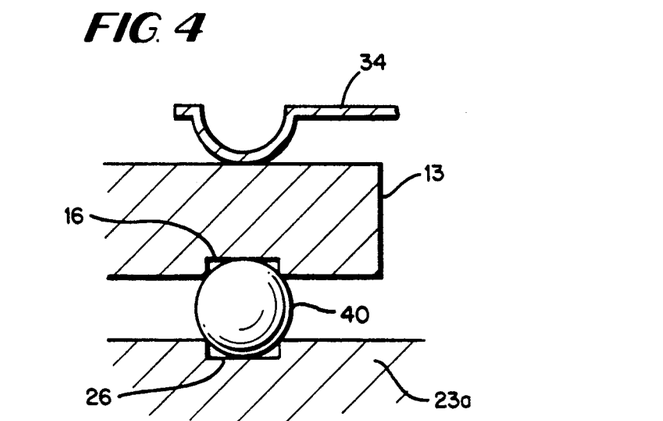
FIG. 4 is a partial sectional view showing a support between the adjusting board and a base of the device of FIG. 1.

The hemispherical projection 34a of the pressing plate 34 presses the steel ball 40 against the recess 16 of the adjusting board 13. Thus, when the adjusting board 13 tilts, the steel ball 40 will not come out from the recess 16.

Figures 5, 6:
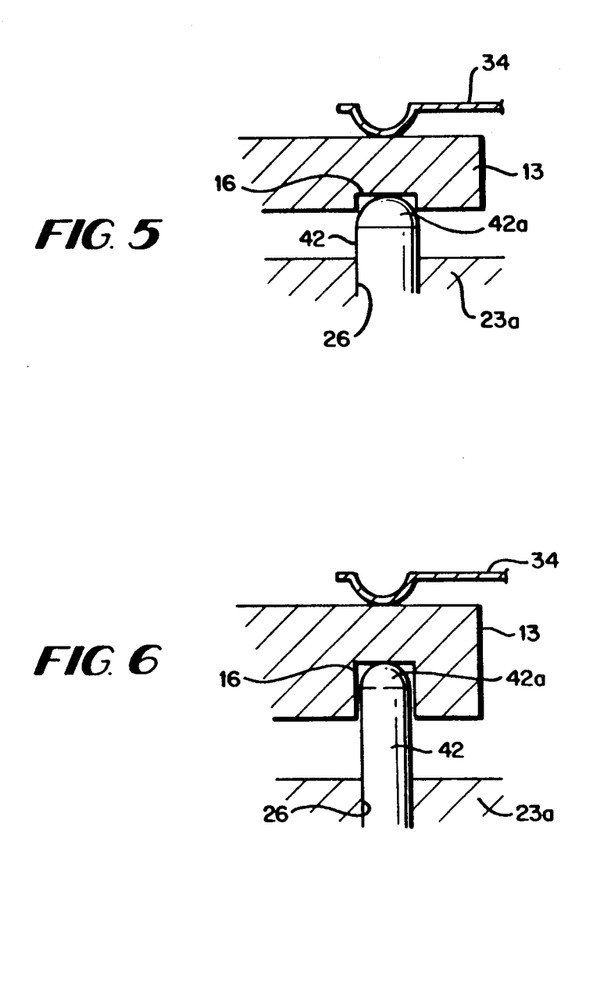
FIG. 5 is a partial sectional view showing an alternative of FIG. 4.
FIG. 6 is a partial sectional view showing another alternative of FIG. 4.

In the above-described example, the steel ball 40 is used as a support means for the tilting movement of the adjusting board 13. However, other variations for such a support means are possible. For example, as shown in FIG. 5, a support pin 42 having a hemispherical top end 42a may be used. The support pin 42 is stably supported by the seat portion 23a by being fitted in the positioning recess 26 thereof.

Further, as shown in FIG. 6, the recess 16 may be formed deep enough to accept the entire portion of the hemispherical top end 42a of the support pin 42. In this case, since the tip of the top end 42a of the support pin 42 and the bottom surface of the recess 16 are in point contact, the tilting movement of the adjusting board 13 is smooth.

Figures 7, 8:
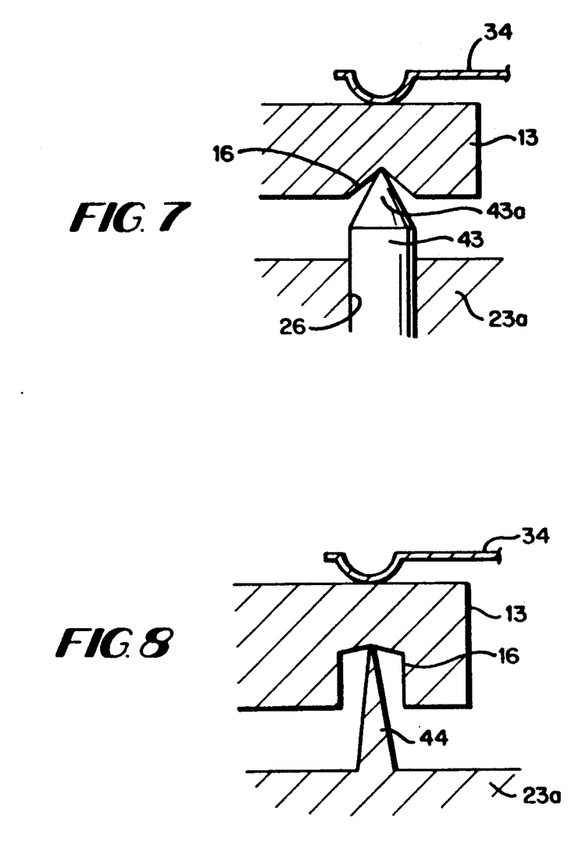
FIG. 7 is a partial sectional view showing still another alternative of FIG. 4.
FIG. 8 is a partial sectional view showing still another alternative of FIG. 4.

Furthermore, as shown in FIG. 7, a support pin 43 having a conical top end 43a may be used. In this case, the recess 16 is also of a conical shape, but with less sharp slope. As in the above case, since the tip of the top end 43a and the tip of the conical recess 16 are in point contact, the tilting movement of the adjusting board 13 is smooth.

Moreover, as shown in FIG. 8, a pointed upward protrusion 44 as a support may be formed integrally with the seat portion 23a so that tilting movement of the adjusting board 13 can be smooth. In this case, since the protrusion 44 is integrally formed with the seat portion 23a, the manufacturing process is simplified and the cost is reduced. The material for the protrusion 44 is not specified, but a material such as a plastic can be used as far as it is strong enough to stand this use.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An inclination adjusting device for an objective lens for an optical information recording and reproduction apparatus, comprising:
   a base providing a level for the adjustment of an inclination;
   a plate spring holding the objective lens in an end portion thereof;
   a flat adjusting board supported on the base, the other end portion of the plate spring being fixed to the adjusting board in a manner that the plate spring extends from the adjusting board;
   a support means for supporting the adjusting board at one of two portions thereof divided along the longitudinal direction of the plate spring in a manner that the adjusting board can tilt against the base in the longitudinal direction of the plate spring and in the direction crossing the longitudinal direction;
   a pair of adjusting means for moving the adjusting board vertically at certain portions thereof along the longitudinal direction of the plate spring and the direction crossing the longitudinal direction through the support means as a support point; and
   a single guide pin for positioning the adjusting board with regard to the base, the guide pin being supported on the base and extending through a guide hole on the adjusting board sized to permit tilting of the adjusting board in two dimensions.

2. An inclination adjusting device according to claim 1, wherein the support means comprises a first recess formed in the base, a spherical element fitted in the first recess, and a second recess formed in the surface of the adjusting board facing the base to receive the spherical element.

3. An inclination adjusting device according to claim 1, wherein the support means comprises a support pin having a hemispherical top end disposed in the base, and a recess formed in the surface of the adjusting board facing the base to receive the top end of the support pin.

4. An inclination adjusting device according to claim 3, wherein the support pin is integrally formed with the base.

5. An inclination adjusting device according to claim 3, wherein part of the hemispherical top end of the support pin is fitted in the recess.

6. An inclination adjusting device according to claim 3, wherein the entire hemispherical top end of the support pin is fitted in the recess, and is in point contact with the bottom surface of the recess.

7. An inclination adjusting device according to claim 1, wherein the support means comprises a support pin having a pointed conical top end disposed in the base, and a conical recess formed in the surface of the adjusting board facing the base.

8. An inclination adjusting device according to claim 7, wherein the support pin is integrally formed with the base.

* * * * *